Jan. 31, 1933. S. RUBEN 1,895,489
METHOD AND AN APPARATUS FOR ELECTRICALLY EFFECTING SYNTHETIC REACTIONS
Filed Jan. 9, 1930

Inventor
SAMUEL RUBEN
By his Attorney

Patented Jan. 31, 1933

1,895,489

UNITED STATES PATENT OFFICE

SAMUEL RUBEN, OF NEW YORK, N. Y., ASSIGNOR TO RUBEN PATENTS COMPANY, OF NEW ROCHELLE, NEW YORK, A CORPORATION OF DELAWARE

METHOD AND AN APPARATUS FOR ELECTRICALLY EFFECTING SYNTHETIC REACTIONS

Application filed January 9, 1930. Serial No. 419,725.

This invention relates to a method and an apparatus for electrically effecting synthetic reactions, and more particularly it relates to a method and an apparatus for combining gases with fluids or other gases, such as the hydrogenation of oils and the fixation of atmospheric nitrogen, by means of an electrical discharge.

An object of the invention is the provision of an efficient means for synthetically combining gases with fluids or other gases.

The invention will be described with particular reference to an efficient means for producing reactions between ionized oxygen and nitrogen through the elimination of a secondary factor which has heretofore constituted a limitation in the combination of oxygen and nitrogen by means of an electrical discharge. The limitation referred to is the thermal decomposition of nitric oxide after the gas has passed through the electrical discharge effecting the combination of gases. It is known that the thermal reaction between nitrogen and oxygen producing nitric oxide, is a reversible one, and that a large percentage of the reaction product decomposes into its separate element after leaving the electrical discharge area, due to the continued high temperature beyond the reaction zone, preventing a sufficiently rapid cooling of the gases.

Another limiting factor involved in the employment of an arc discharge effecting the combination of gases, etc., at atmospheric pressure, is the tendency to localization of current discharge with the resultant restricted distribution of current and a surplus of untreated or diluting air.

In the apparatus of my invention these limiting factors are reduced to a negligible degree with a consequent increase of electrochemical efficiency.

The chief fundamentally novel factors employed in my invention for the treatment of gases or liquids and gases, are the maintenance of an electrical discharge across a low pressure gas filled space and the means for maintaining a low gas pressure within the gap, the latter by means of the discharge of a fluid or vapor through an aspirator, the fluid or vapor discharge also serving as a quenching or a means for practically instantaneously cooling the gases treated by the electrical discharge.

Figure 1:
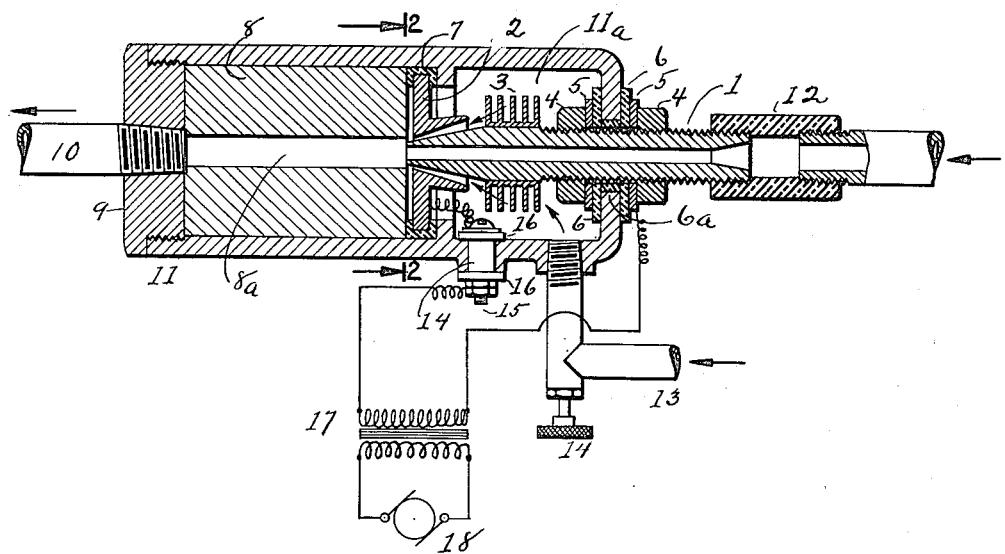
Figure 2:
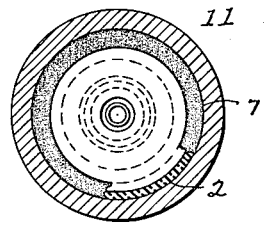

For a more complete understanding of the apparatus and the method of my invention, reference is made to the accompanying drawing which illustrates one embodiment thereof as applied to the treatment of gases as in the fixation of atmospheric nitrogen, in which Fig. 1 represents a lateral view of the device in section and Fig. 2, a plan view of the device at 2—2.

Referring particularly to Fig. 1, 1 represents an aspirator tubular electrode extending into metal container 11, one end of which is closed by insulating disc 9. Within the container is a metal diaphragm, or opposing electrode 2, having an orifice through which electrode 1, axially projects, an annular space separating the electrodes. Electrode 1 is held in position by nuts 4, with metal washers, 5, and insulating washers 6, which latter, in combination with bushing $6_a$, serve to insulate the tubular electrode from the walls of the container. Electrode 2 is maintained in position by grooved insulating ring washer 7. Mounted on electrode 1 are metal flanges for raising the temperature of gases passing in contact therewith prior to treatment.

Within the container at the far side of diaphragm electrode 2 is metal block 8 having an orifice $8_a$ through which the fluid and gases are discharged. At 10 is an outlet conduit. Gas is admitted into the chamber through inlet pipe 13, controlled by a needle valve through stem 14. Attached to the inlet pipe for admitting the fluid or vapor into the aspirator tube is a coupling made of an insulation material 12. The chamber into which the gas to be treated is admitted within the container is designated by $11_a$. Through proper leads the electrodes are connected with transformer 17, and generator 18. At 15 is a bolt for carrying one lead to electrode 2, the bolt being insulated by bushing 14 and washers 16.

In the operation of the method of my invention as applied to this particular device in the fixation of atmospheric nitrogen, water passes through electrode 1 and discharges from the nozzle into tubular space $8_a$, and out through conduit 10. In discharging from the aspirator electrode the water creates a vacuous gap in the annular space between the electrodes 1 and 2, lowering the pressure in chamber $11_a$. When water is applied at a pressure of seventy pounds, with the device at normal room temperature, the pressure in chamber $11_a$ is reduced to 740 m. m. A stream of air is admitted through inlet pipe 13, in sufficient volume to maintain the air in the chamber at low pressure, the air then contacting with the flanges 3, which preheat the air before its passage through the annular space between the electrodes. A high potential current is discharged across the annular gap and, due to low air pressure therein, flows uniformly through, at the same time ionizing the air, forming nitric oxide; this product is immediately cooled by the ejected water as the gas leaves the gap, preventing thermal decomposition of the nitric oxide. The yield is more closely dependent upon the energy density applied than upon its cooling.

This apparatus is described particularly in reference to its application to the fixation of atmospheric nitrogen by the reaction caused between the nitrogen and oxygen. I have found that the method and apparatus are equally well adapted to effecting other reactions such as the combination of nitrogen and hydrogen forming ammonia; also to such synthetic reactions as the hydrogenation of oils, in which latter application hydrogen is admitted through the inlet pipe 13, and the stream of oil is passed through the aspirator, maintaining a low pressure of the hydrogen under treatment, the monatomic hydrogen formed, then combining with the hydro-carbon. The treatment can be repeated until the desired density of product is obtained. It is practicable to discharge the oil through the electrode either as a fluid or as a vapor.

What I claim is:

1. The method of promoting electro-chemical reactions which consists in passing a fluid through a tube under pressure, admitting a gaseous material into a partially closed chamber, heating the gaseous material and passing the gaseous-material at a pressure below atmospheric pressure through an annular space separating opposing electrodes by the suction due to the passing of said fluid, ionizing the gaseous material by discharging a current across said space and discharging the ionized gaseous material into contact with the fluid.

2. An apparatus for promoting electro-chemical reactions which comprises a vessel having co-axially arranged opposing electrodes separated by an annular gas ionization space, the inner of said electrodes affording a conduit for a fluid stream, a partially closed chamber through which said inner electrode projects, a plurality of metal plates extending within said chamber, means for heating said plates, means for admitting gas into the chamber, an outlet from the chamber for the gas through the annular space, means for ionizing the heated gas within said annular space, means for discharging the ionized gas into contact with the fluid adjacent the annular space, a conduit open at opposite ends for the passage of the mixture of the gas and fluid.

3. An apparatus for promoting electro-chemical reactions which comprises a vessel having therewithin an aspirator projecting through a partially closed chamber having heater plates therewithin, the nozzle of the aspirator comprising one of co-axially arranged electrodes, separated by an annular space open to said chamber, means for admitting a gas into the chamber, means for heating the plates, means for ionizing the heated gas within the annular space, means for discharging the heated ionized gas from the space into contact with a fluid discharged through the aspirator, means for carrying off the mixture of gas and fluid.

4. An apparatus for promoting electro-chemical reactions which comprises, in combination, a gas heating chamber, an aspirator, a nozzle of the aspirator constituting one of co-axially arranged opposing electrodes, separated by an annular space open to said chamber, means for passing the heated gas at low pressure through said space and into contact with a fluid column.

5. The method of promoting electro-chemical reactions which consists in heating a column of gaseous material at lower than atmospheric pressure, ionizing said heated gaseous material at low pressure in a thin layer within an ionized annular space and discharging the ionized gas into contact with a fluid column moving under pressure.

6. An apparatus for promoting electro-chemical reactions which comprises a vessel having concentrically arranged opposing electrodes separated by an annular space, a conduit, a partially closed chamber through which said conduit extends, means for admitting gas into the chamber, an outlet from the chamber for the gas through the annular space, in combination with means for ionizing the gas within said annular space, means for passing a liquid column through the conduit, means for discharging the ionized gas into contact with the liquid column adjacent the annular space, and means for carrying off the mixture of the gas and liquid.

Signed at New York, in the county of New York and State of New York, this 8th day of January, A. D. 1930.

SAMUEL RUBEN.